C. FAK.
TIRE RIM FOR VEHICLES.
APPLICATION FILED MAR. 2, 1920.
1,389,496.
Patented Aug. 30, 1921.
2 SHEETS—SHEET 1.
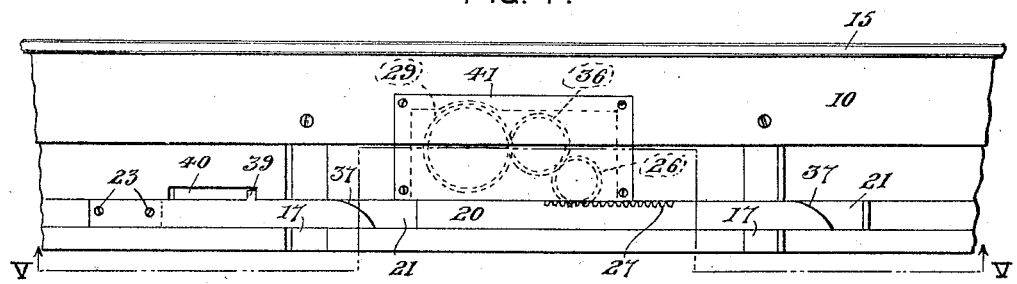
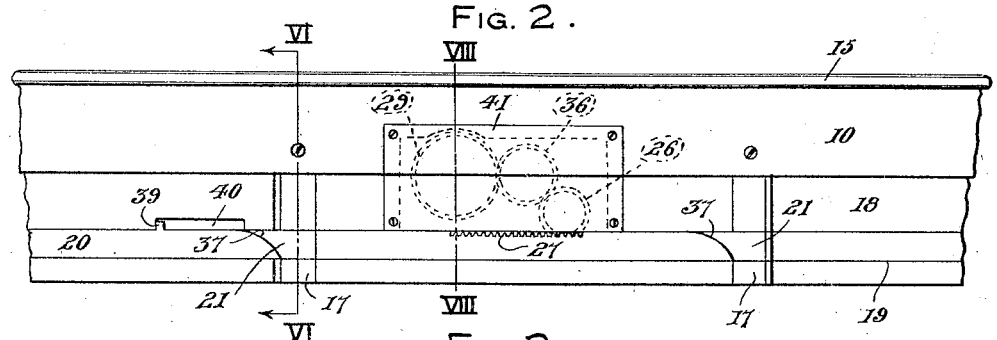
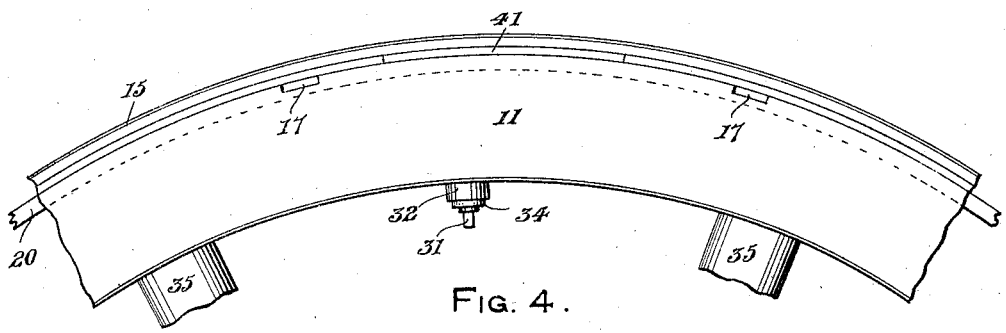
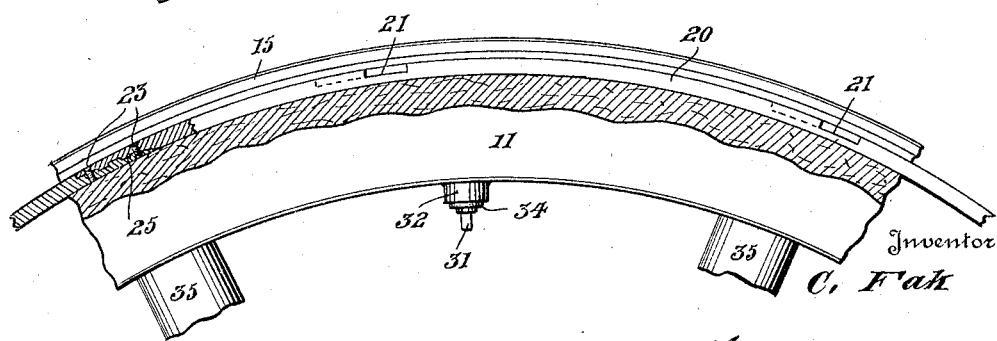
Inventor
C. Fak
By
N. M. Wilson
Attorney

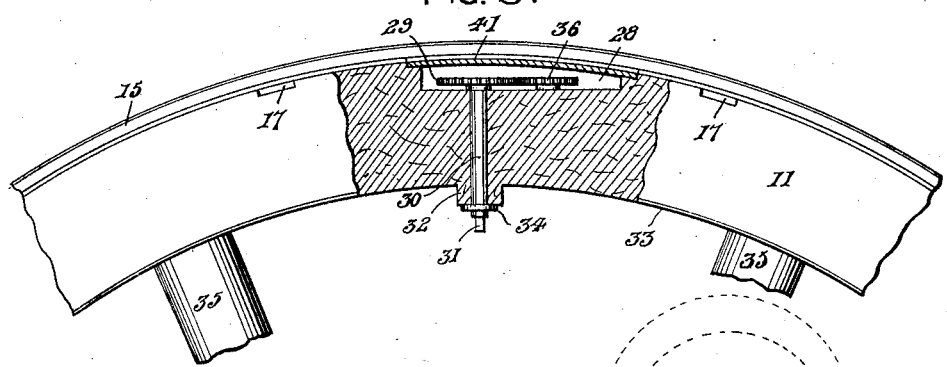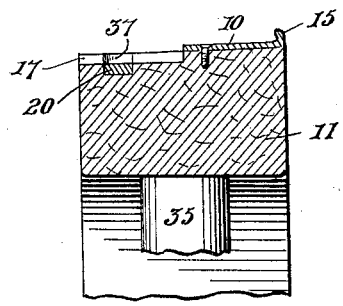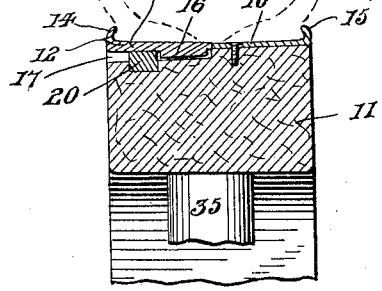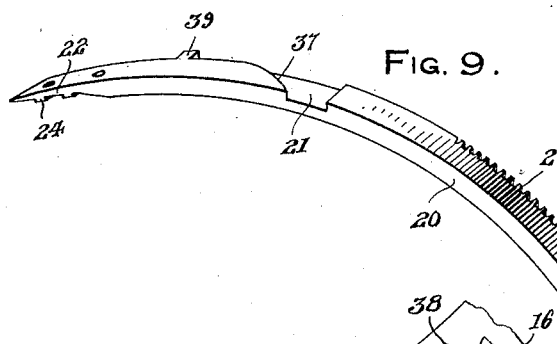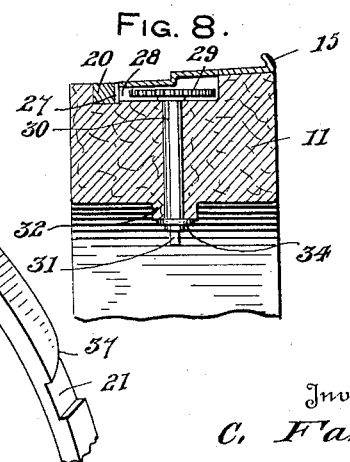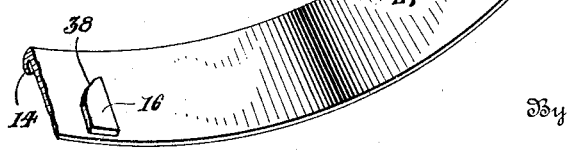

UNITED STATES PATENT OFFICE.

CIRIL FAK, OF BUSH, ILLINOIS.

TIRE-RIM FOR VEHICLES.

1,389,496.  Specification of Letters Patent.  Patented Aug. 30, 1921.

Application filed March 2, 1920. Serial No. 362,845.

*To all whom it may concern:*

Be it known that I, CIRIL FAK, a citizen of the United States of America, residing at Bush, in the county of Williamson and State of Illinois, have invented certain new and useful Improvements in Tire-Rims for Vehicles, of which the following is a specification.

The primary object of the invention is the provision of a demountable rim for vehicles such as automobiles adapted for readily securing a tire thereon and releasing the same therefrom, without the employment of the usual removable clamp plates and only requiring the use of an ordinary wrench.

A further object of the invention is the provision of a vehicle rim with a removable flange and operating mechanism for locking the flange in position when the tire is mounted upon the rim and for releasing the flange when desiring to remove the tire, such operations being actuated inwardly of the wheel felly and between the spokes thereof.

With these general objects in view the invention consists of the novel combination and arrangement of parts hereinafter more fully described in the accompanying drawings in which like designating characters refer to corresponding parts throughout the several views.

In the drawings,

Figure 1 is a plan view of a portion of a vehicle wheel showing the tire-receiving face of the rim with one flange removed and the securing means illustrated in its locked and projected position, Fig. 2 is a view similar to Fig. 1 with its securing means in its released or retracted position, Fig. 3 is a side elevation thereof, Fig. 4 is a view similar to Fig. 3, with parts broken away, Fig. 5 is a similar view broken away taken upon line V—V of Fig. 1, to illustrate the operating mechanism, Fig. 6 is a transverse sectional view taken upon line VI—VI of Fig. 2, Fig. 7 is a view similar to Fig. 6, with the removable flange of the rim locked in its operative position, a tire being illustrated by dotted lines, mounted in the rim, Fig. 8 is a detail sectional view taken upon line VIII—VIII of Fig. 2, Fig. 9 is a perspective view of a portion of the locking hoop and Fig. 10 is a perspective view of a portion of the removable flange showing the inner side thereof.

Referring more in detail to the drawings, it will be understood that my invention comprises a tire-carrying rim having one part or half 10 permanently secured to the periphery of a felly 11 while the other part or half 12 may be readily assembled upon the periphery of the felly 11 for supporting a tire such as 13, and is easily removable for removing the tire, a particular form of locking means being provided for the removable portion 12 of the rim.

The removable rim section 12 constitutes a flange member having a flange 14 at its outer edge adapted to coöperate with the flange 15 at the outer edge of the rim portion 10 and lugs 16 are provided upon the inner face of the rim portion or section 12, adapted for slidable reception in transverse slots 17, provided in the periphery 18 of the felly 11.

A groove 19 circumferentially of the felly 11 in the periphery 18 thereof traverses said slots 17 and is provided with a locking ring or hoop 20 slidable in said groove. Transverse passages 21 opening outwardly of the ring 20 are adapted for alining with the slots 17 of the felly 11 permitting the lugs 16 to freely slide through the slots 17 and passages 21 when the flange member 12 is being placed in position upon the felly 11.

The ring 20 is in the form of a split ring with beveled ends 22 adapted for overlapping and normally secured together by screws 23. The adjacent contacting faces of the ends 22 are complementally formed with transverse ribs 24, upon the one end adapted for reception within transverse sockets 25 in the other end 22 whereby a strong joint is provided for the ring 20.

A pinion 26 is journaled within a pocket 28 formed in the periphery 18 of the felly 11, said pinion 26 being in constant mesh with a toothed or rack portion 27 of the ring 20. A gear 29 within said pocket 28 is fixed to the end of a shaft 30 radially journaled through the felly 11 with a squared inner end 31 adapted for engagement by any suitable form of wrench.

A boss 32 is provided upon the inner periphery 33 of the felly 11 through which the shaft 30 extends while a washer 34 is secured to said shaft outwardly of the boss 32, it being noted that the wrench-hold surface 31 is positioned between the adjacent spokes 35 of the wheel.

An idler pinion 36 within the pocket 28 is in constant mesh with the pinion 26 and the gear 29 so that the turning of the shaft 30 results in turning the pinion 26 in a corresponding direction, slidably moving the ring 20 within the groove 19 in either direction desired. When the removable flange member 12 is slidably positioned upon the felly periphery 18 with the lug 16 inserted through the slot 17, the lugs 16 will be positioned inwardly of the plane of the groove 19 and with the inner edge 27 of the flange member 12 substantially in contact with the inner edge of the opposite or fixed rim portion 10, thereby permitting the free shifting of the ring 20 for positioning the passages 21 out of alinement with the slot 17 and outwardly of the lugs 16. When the ring 20 is so projected it is in its locking position, rendering it impossible to remove the rim section 12, from the felly 11, until the ring 20 has been shifted to the opposite extremity of its movement by turning the shaft 30 and bringing the passages 21 in alinement with the slot 17.

The locked or projected position of the ring 20 is best illustrated in Figs. 1 and 7 of the drawings, while the released position of the ring 20 is shown in Fig. 2.

The passages 21 are provided with curved walls 37 at corresponding sides thereof, while the lugs 16 have curved sides 38 adapted to be engaged by said passage walls 37 during the locking operation when the removable flange 12 has not reached its innermost position but the lugs 16 projecting slightly within the passages 21 result in the engagement of the curved faces 38 of the lugs by the curved walls 17 of the passages 21, during the circumferential shifting of the ring 20 to its locking position. This results in forcing the lugs 16 and removable flange member 12 inwardly to its assembled position while the continued movement of the ring 20 locks the removable flange in the manner heretofore described.

A finger 39 projects from the ring 20 within a notch 40 in the outer face of the felly 11 and forms a stop for limiting the shifting movement of the ring 20 as well as insuring the accurate positioning of the ring when in its retracted released position with the passages 21 alining with the slots 17. A cover plate 41 is preferably provided over the pocket 28 and it will be apparent that when the tire 13 is mounted upon the rim sections 10 and 12, the removable section 12 may be readily locked in position by applying a wrench to the squared end 31 of the shaft 30 and revolving said shaft in the proper direction. The releasing of the section 12 is accomplished by revolving the shaft 30 in a reverse direction, permitting the section 12 to be removed for removing the tire 13.

While the form of the invention herein set forth is believed to be preferable, it will nevertheless be understood that minor changes may be made therein without departing from the spirit and scope of the invention as claimed.

Having thus described my invention, what I claim as new and desire to secure by Letters Patent, is:—

In combination with a felly having an annular groove and transverse slots intersecting said groove with a relatively short longitudinal groove adjacent the annular groove, a rim section removably mounted upon the periphery of the felly overlying said slots and grooves, inwardly projecting lugs upon said rim section having correspondingly curved sides, a locking ring for said rim section slidable within the annular groove of the felly, said ring having transverse passages provided with curved side walls adapted for engaging the curved faces of the lugs during the sliding movement of the ring in its locking position, and a pin carried by said ring and movable within the relatively short slot for limiting the movement of the ring.

In testimony whereof I affix my signature.

CIRIL FAK.

Witnesses:
JAMES FOSTER,
FRANK PEDLOW.